(12) United States Patent
Fanti

(10) Patent No.: US 6,694,682 B2
(45) Date of Patent: Feb. 24, 2004

(54) MULTICOMPONENT TILES AND A METHOD FOR MANUFACTURING MULTICOMPONENT TILES

(75) Inventor: Luigi Fanti, Coventry (GB)

(73) Assignee: The Amtico Company Limited, Coventry (GB)

(*) Notice: Subject to any disclaimer, the term of this patent is extended or adjusted under 35 U.S.C. 154(b) by 0 days.

(21) Appl. No.: 09/801,493

(22) Filed: Mar. 8, 2001

(65) Prior Publication Data
US 2001/0034983 A1 Nov. 1, 2001

(30) Foreign Application Priority Data
Mar. 9, 2000 (GB) .............................. 0005539

(51) Int. Cl.$^7$ ............................... E04F 15/02
(52) U.S. Cl. .................. 52/177; 52/311.1; 52/311.2
(58) Field of Search ................. 52/177, 311.1, 52/311.2, 313, 391; 428/46, 47, 48

(56) References Cited

U.S. PATENT DOCUMENTS

| | | | |
|---|---|---|---|
| 1,828,193 A | | 10/1931 | Levin |
| 2,118,841 A | * | 5/1938 | Elmendorf .................. 52/313 |
| 2,274,468 A | * | 2/1942 | Bell .......................... 112/421 |
| 3,516,894 A | | 6/1970 | Slosberg ..................... 161/39 |
| 4,293,362 A | * | 10/1981 | Drobina ...................... 144/355 |
| 4,678,528 A | * | 7/1987 | Smith et al. ................ 156/220 |
| 4,828,896 A | * | 5/1989 | Fanti .......................... 156/303.1 |
| 5,834,081 A | * | 11/1998 | Fanti .......................... 156/268 |
| 6,021,615 A | * | 2/2000 | Brown ....................... 428/167 |
| 6,068,904 A | * | 5/2000 | Stearns ...................... 428/45 |
| 6,298,624 B1 | * | 10/2001 | Pacione ...................... 52/511 |
| 6,343,447 B2 | * | 2/2002 | Geissels et al. ............. 52/173.3 |
| 6,413,618 B1 | * | 7/2002 | Parker et al. ............... 428/195 |

FOREIGN PATENT DOCUMENTS

| | | | | |
|---|---|---|---|---|
| FR | 2 675 178 | | 10/1992 | ......... E04F/15/10 |
| WO | WO 84/03322 | * | 8/1984 | ................. 52/177 |
| WO | WO 93/13281 | * | 7/1993 | ......... E04F/15/10 |
| WO | WO 94/06981 | | 3/1994 | ......... E04F/15/10 |
| WO | WO 84/03322 | * | 8/1994 | ................. 52/177 |
| WO | WO 99/06645 | | 2/1999 | ........... E04B/9/00 |

* cited by examiner

Primary Examiner—Brian E. Glessner
(74) Attorney, Agent, or Firm—Rachel L. St. Peter; Doreen J. Gridley

(57) ABSTRACT

A plastics floor covering (1) comprises a plurality of discrete plastics components (2, 3, 4) each having an upper surface and a lower surface (lower surface shown). The discrete components (2, 3, 4) are assembled together to form a predetermined design and are held in the assembled position to form a unitary floor covering (1) by at least one portion of a joining film (14) secured to the lower surface of each discrete component (2, 3, 4). The joining film (14) spans at least the edges of neighboring discrete components (2, 3, 4) and is coated with a thermally labile polymeric coupling agent. The joining film (14) is perforated in a preferred embodiment of the invention.

10 Claims, 2 Drawing Sheets

MULTICOMPONENT TILES AND A METHOD FOR MANUFACTURING MULTICOMPONENT TILES

BACKGROUND OF THE INVENTION

The present invention relates to floor coverings, particularly tiles, and a method of manufacturing floor coverings from plastics materials.

In particular the present invention is concerned with the manufacture of plastics floor coverings such as tiles which have a predetermined pattern but are made up from a number of discrete components.

It is known in the art to create a tile having a predetermined design which comprises placing a number of discrete components together to form the required design and covering the upper surface of the resulting multicomponent tile with an adhesive sheet which is usually transparent. The sheet holds the discrete components in place while the design is laid as a single tile on a surface such as a floor. The adhesive sheet is then removed and the result is a tiled surface having a design made up of a number of discrete components. Although the above described method allows a multicomponent design to be created in a design studio and stored, transported and laid as a single tile, the method is not entirely satisfactory. The adhesive sheet has to be capable of being removed from the surface of the multicomponent tile and can therefore become separated from the multicomponent tile during storage, transportation or laying, resulting in components missing from the tile. Furthermore, the adhesive sheet can become discoloured during storage or display, which can make the appearance of the multicomponent tile covered with the adhesive film unattractive to potential customers.

It is also known in the art to produce a plastics tile comprising a number of discrete components which are shaped relative to each other and assembled edge to edge to form a design. The discrete components are then joined together at their abutting edges, by methods such as welding, to produce a unitary tile. This method is described in International Patent Publication no. WO 93/13281 in the name of the applicants.

The method described in WO 93/13281 is disadvantageous because whenever a new design is created a new welding press must be prepared, which is very expensive.

SUMMARY OF THE INVENTION

The object of the present invention is to provide a floor covering, such as a plastics tile, which is made of a number of discrete predetermined shaped components which are joined together to produce a unitary floor covering, but which overcomes the problems associated with the prior art methods set out above by using a joining film to join the discrete pieces together to form a unitary floor covering.

According to a first aspect the present invention provides a plastics floor covering comprising a plurality of discrete plastics components, each having an upper surface and a lower surface, said components being assembled together to form a predetermined design and held in the assembled position to form a unitary floor covering by at least one portion of a joining film secured to the lower surface of each discrete plastics component and spanning at least the edges of neighbouring discrete components.

Preferably, the floor covering is a plastics floor tile. The plastics floor covering may be made from polyvinyl chloride, polyolefins, acrylic polymers, polycarbonate polymers or ionomeric polymers, depending on the desired end use.

The joining film is preferably of the same plastics material as the lower surface of the discrete plastics components. Alternatively, the joining film may be made of a plastics material having physical properties compatible with those of the lower surface of the discrete plastics components. The use of such a joining film reduces the amount of distortion of film or floor covering which can occur.

The joining film is preferably 60 to 85 microns thick, most preferably 75 microns. The joining film is preferably coated with a thermally labile polymeric coupling agent. The coupling agent is preferably polyurethane based but its composition is to some extent dependent on that of the lower surface of the floor covering and of the joining film.

The coupling agent is preferably applied to the joining film in amounts of 10–100 g/m$^2$, most preferably about 20 g/m$^2$.

Although it would be possible to fuse the joining film directly to the lower surface of the discrete plastics components by the use of heat alone, this process would take 5 to 10 minutes at a temperature of 150–170° C. and would adversely affect the upper surface of the floor covering. The use of the coupling agent allows the joining film to be secured to the lower surface of the discrete plastics components by the application of heat for a period of 5 to 15 seconds, preferably 10 seconds. This avoids damage to the upper surface of the discrete plastics components. The coupling agent becomes cross-linked with the film and with the lower surface of the discrete components.

Preferably, the film is provided with perforations, so as to allow portions of the lower surface of the plastics components to contact the surface on which the unitary floor covering is to be laid. This avoids the problem of the film only being adhered to the surface on which the tile covering is to be laid and prevents the discrete plastics components from becoming detached from the film and/or from the surface on which the covering is to be laid. The perforations may be circular, square or of any other convenient shape. Alternatively, the film may be non-continuous, for example it may comprise a number of small pieces of film, each piece spanning neighbouring edges of adjacent discrete components.

Preferably, the discrete plastics components abut edge to edge to form the predetermined design. The upper regions of the abutting edges of the discrete plastics components may be provided with a recess or be chamfered so as to provide, in use, recesses extending downwardly from the top surface of the plastics pieces, along the abutting edges. The recesses are preferably V-shaped.

Preferably, the lower surface of the discrete plastics components is roughened to enhance keying between the plastics components and the joining film and/or the surface on which the floor covering is to be laid.

Preferably, each discrete plastics component comprises a top wear layer of a translucent plastics material, a printed decorative layer and at least one backing layer.

The backing layer nearest the wear layer may contain one or more coloured pigments and is commonly called the face ply. If no printed decorative layer is present, then the face ply itself provides the desired decorative appearance. If the floor covering includes a printed decorative layer, then the face ply serves to enhance the appearance of the printed decorative layer as seen through the wear layer. The face ply is often of a bright colour, for example white, although it may be of a neutral colour such as black. The other backing layers more remote from the wear layer commonly contain carbon black to provide a neutral opaque background behind the face ply. All the backing layers, including the face ply, commonly contain fillers such as calcium carbonate, hydrated aluminium oxide, kaolin or other suitable particulate or fibrous mineral fillers.

According to a further aspect, the present invention provides a method of manufacturing a plastics floor covering, the method comprising the steps of cutting a plurality of discrete plastics components, each said component having an upper surface and a lower surface, from one or more sheets of a plastics material, assembling the pieces together to form at least a portion of a floor covering of the desired shape and design, securing the discrete plastics components together relative to one another by the application of at least one portion of a joining film to the lower surface of the assembled plastics components so that the joining film spans at least the neighbouring edges of adjacent discrete components.

The plastics floor covering is preferably a floor tile.

The joining film is preferably of the same material as, or of a plastics material having physical properties compatible with, the lower surface of the discrete plastics components.

The joining film is preferably 60 to 85 microns, most preferably 75 microns, thick.

The joining film is preferably coated with a thermally labile polymeric coupling agent which is most preferably polyurethane based. The coupling agent is preferably applied to the film in amounts of 10 to 100 g/m², most preferably about 20 g/m².

When applying heat and pressure to the lower surface of the plastics components, the upper surface can be affected and damaged by the heat and pressure.

Therefore, the heat and pressure is applied for a short period of time, preferably 7–15 seconds, most preferably 10 seconds. The temperature used is preferably 130–170° C. most preferably about 150° C. The pressure used is preferably 4–6 MPa, most preferably about 5 MPa.

The temperature and pressure applied are sufficient to cause the coupling agent to react with the joining film and with the lower surface of the floor covering.

While applying the heat and pressure to the lower surface of at least the portion of the floor covering, the upper surface of the portion is cooled to ambient temperature (20–25° C). The cooling is preferably carried out by use of cold water, most preferably at 20° C.

Pressure is preferably applied by means of a rubber press, which ensures substantially complete contact of the joining film and the lower surface of the discrete plastics components which is preferably roughened to enhance keying.

The discrete plastics components may be cut from a sheet of plastics material so as to have recessed or chamfered edges extending downwards from the top surface of the plastics pieces, along the abutting edges.

BRIEF DESCRIPTION OF THE DRAWINGS

The present invention will now be further described, by way of example only and with reference to the accompanying drawings, in which.

DESCRIPTION OF THE PREFERRED EMBODIMENTS

Figure 1:
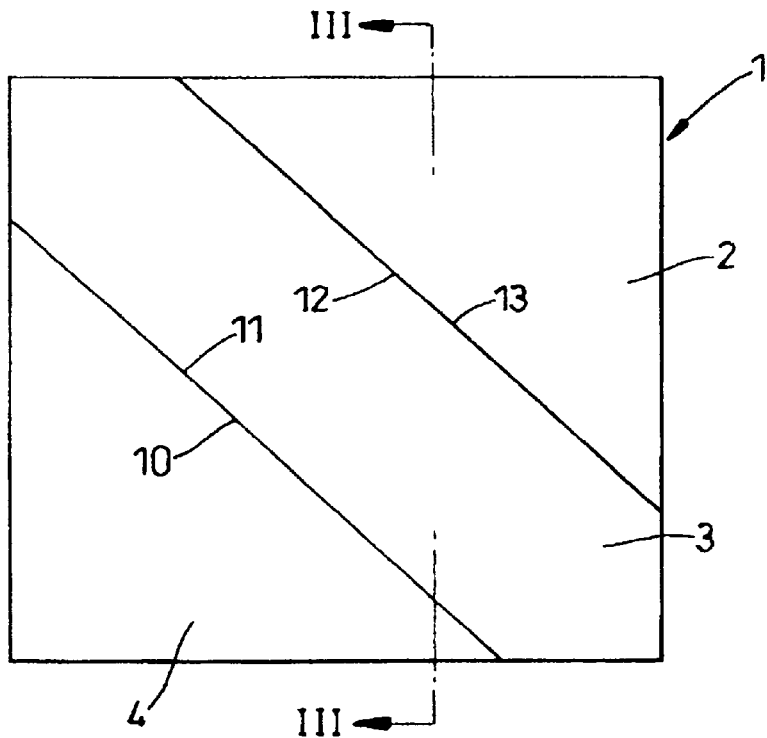
FIG. 1 is a plan view of the upper surface of a tile constructed in accordance with the present invention.

FIG. 1 shows a plastics floor tile 1 made up of discrete components 2, 3 and 4. The components 2, 3 and 4 are complementary in shape and fit together to form the substantially square tile 1. The components 2, 3 and 4 are cut from large sheets of plastics material.

The sheets of plastics material from which the components 2, 3 and 4 are cut comprise an upper translucent wear layer which is bonded to a thin film printed with a decorative pattern. The decorative film is bonded to a face ply layer which is coloured and provides a background for the decorative film. The face ply layer is then bonded to two backing layers. The components 2, 3 and 4 are PVC-based laminates which can be homogenous or heterogeneous.

Figure 3:
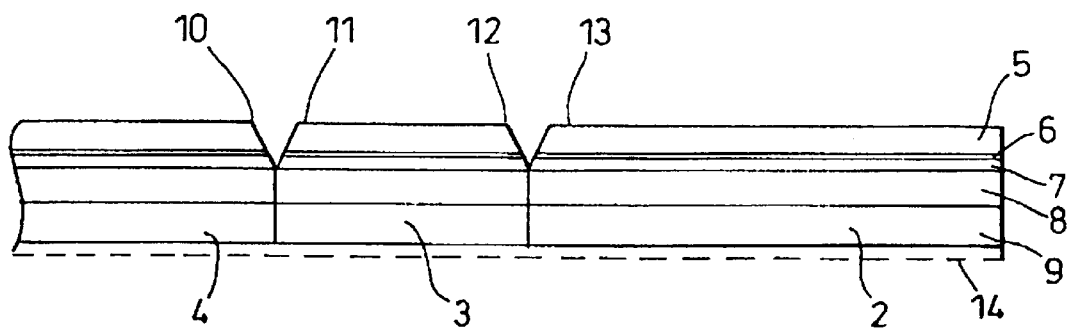
FIG. 3 is partial section on line III—III of FIG. 1.

The structure of the components can be seen clearly in FIG. 3. Each component has a wear layer 5, a decorative film 6, a face ply 7 and two backing layers 8 and 9. The pattern provided by the printed decorative film and the colour of the face ply may vary from component to component to give the desired pattern.

In the tile of FIG. 1 the components 2 and 4 are each provided with a printed decorative film to give a marbled effect and a white face ply to give the overall effect of white marble. The component 3 is provided with a printed decorative film to give a woodgrain effect and a brown face ply to give the overall effect of wood.

The layers in the sheets of plastics material and thus the tile components are bonded together by heat bonding under pressure to produce laminated sheets about 3 mm thick.

It is of course possible to have any number and arrangement of separate components forming a tile of any desired shape.

The components 2, 3 and 4 are cut so that the edges which abut each other, edges 10 and 11, 12 and 13, are chamfered. The chamfer is approximately 45° and does not extend any further than through wear layer 5 and printed decorative layer 6.

The components 2, 3 and 4 are arranged to make a tile precursor of the desired design. The components are then placed in a modified hot press with their backing layers 9 facing uppermost.

Figure 2:
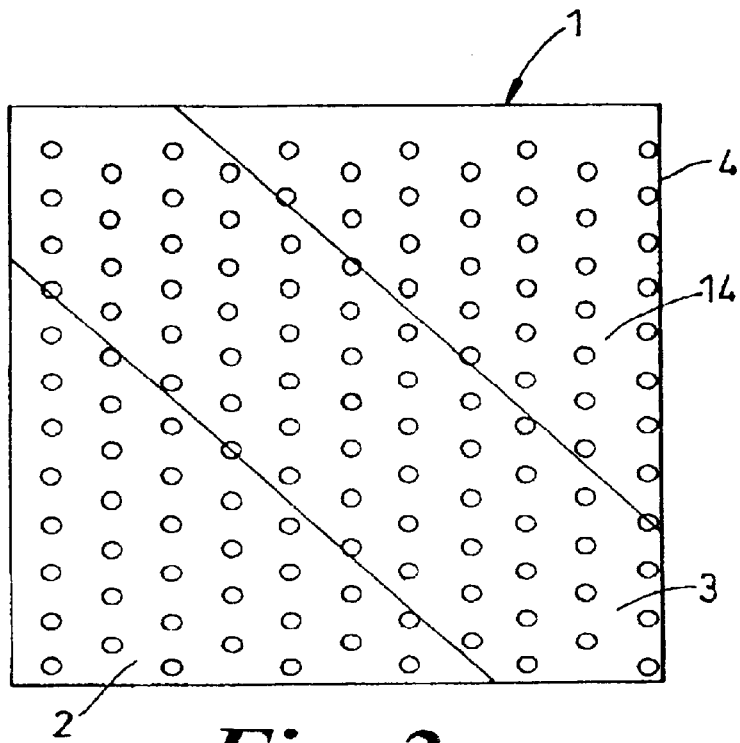
FIG. 2 is a plan view of the lower surface of the tile of FIG. 1.

A film 14 of 75 micron PVC, coated on one side with a thermally labile polyurethane based polymeric coupling agent, is positioned over the backing layers 9 of the components making up the tile precursor (see FIG. 2) such that the polymeric coating is in contact with the backing layers 9.

The PVC film 14 is provided with perforations 15, ensuring that areas of the backing layers 9 of the components forming the tile precursor are exposed through the film 15, so that the exposed areas contact the surface on which the tile is to be laid.

The polymeric coating on the PVC is activated by the application of heat and pressure, which causes it to cross-link to the film and the lower surface of the discrete plastics components.

The hot press applies a temperature of 150° C. for 10 seconds at a pressure of 5 MPa by means of a rubber press, which ensures complete contact of the film and lower surface of the discrete components, even where the lower surface has been roughened.

To avoid the application of the heat and pressure adversely affecting the upper surface of the tile precursor, the press is modified to maintain an ambient temperature of 20–25° C. around the upper surface of the tile precursor. This may be achieved by providing a water-jacket for the upper part of the press.

The resulting tile comprises components 2, 3 and 4 held in position by film 14.

The tiles, when laid on a surface such as a floor, give the overall impression of a design made up of discrete components but are easier to store, transport and lay than a number of discrete components.

What is claimed is:

1. A plastics floor tile comprising a plurality of discrete plastics components, each comprising a wear layer having an upper surface and at least one backing layer having a lower surface, and at least one portion of a joining film discrete from said at least one backing layer, said components being assembled together to form a predetermined design and held in the assembled position to form a unitary floor tile by the at least one portion of said joining film secured to said lower surface of each of said discrete plastics component and spanning at least the edges of neighboring said discrete components.

2. The plastics floor tile of claim 1 wherein said joining film is of the same plastics material as said lower surface of said discrete plastics components.

3. The plastics floor tile of claim 1 wherein said joining film is made of a plastics material having physical properties compatible with those of said lower surface of said discrete plastics components.

4. The plastics floor tile of claim 1 wherein said joining film is 60 to 85 microns thick.

5. The plastics floor tile of claim 1 wherein said joining film is coated with a thermally labile polymeric coupling agent.

6. The plastics floor tile of claim 5 wherein said coupling agent is applied to said joining film in amounts of 10–100 g/m$^2$.

7. The plastics floor tile of claim 1 wherein said joining film is provided with perforations.

8. The plastics floor tile of claim 1 wherein said joining film is non-continuous and comprises a number of small pieces of film, each said piece spanning neighbouring edges of adjacent said discrete components.

9. The plastics floor tile of claim 1 wherein said lower surface of said discrete plastics components is roughened.

10. The plastics floor tile of claim 1 wherein each said discrete plastics component comprises a top wear layer of a translucent plastics material, a printed decorative layer and at least one backing layer.

* * * * *